United States Patent
Howington (10) Patent No.: US 8,249,729 B2
(45) Date of Patent: Aug. 21, 2012

(54) SYSTEM AND METHOD FOR CASINO MANAGEMENT

(75) Inventor: David K. Howington, Camarillo, CA (US)

(73) Assignee: Atronic International GmbH, Lübbecke (DE)

( * ) Notice: Subject to any disclaimer, the term of this patent is extended or adjusted under 35 U.S.C. 154(b) by 0 days.

(21) Appl. No.: 13/160,420

(22) Filed: Jun. 14, 2011

(65) Prior Publication Data

US 2011/0288665 A1    Nov. 24, 2011

Related U.S. Application Data

(62) Division of application No. 09/981,653, filed on Oct. 18, 2001, now abandoned.

(60) Provisional application No. 60/241,326, filed on Oct. 18, 2000.

(51) Int. Cl.
*G06F 19/00* (2011.01)
(52) U.S. Cl. ............................................. 700/91
(58) Field of Classification Search .............. 700/91; 463/32, 42
See application file for complete search history.

(56) References Cited

U.S. PATENT DOCUMENTS

| | | | |
|---|---|---|---|
| 5,655,961 A | 8/1997 | Acres et al. | |
| 5,702,304 A | 12/1997 | Acres et al. | |
| 5,741,183 A | 4/1998 | Acres et al. | |
| 5,909,486 A | 6/1999 | Walker et al. | |
| 6,162,122 A | 12/2000 | Acres et al. | |
| 6,229,879 B1 | 5/2001 | Walker et al. | |
| 6,244,958 B1 | 6/2001 | Acres | |
| 6,257,981 B1 | 7/2001 | Acres et al. | |
| 6,327,351 B1 | 12/2001 | Walker et al. | |
| 6,346,956 B2* | 2/2002 | Matsuda | 715/848 |
| 6,368,215 B1 | 4/2002 | Walker et al. | |
| 6,437,777 B1* | 8/2002 | Kamachi et al. | 345/419 |
| 6,511,377 B1 | 1/2003 | Weiss | |
| 7,084,737 B1 | 8/2006 | Moore et al. | |
| 7,350,158 B2* | 3/2008 | Yamaguchi et al. | 715/834 |
| 2001/0031664 A1 | 10/2001 | Acres | |
| 2001/0048374 A1 | 12/2001 | Blad | |
| 2002/0002075 A1 | 1/2002 | Rowe | |
| 2002/0034299 A1 | 3/2002 | Charrin | |
| 2002/0042300 A2 | 4/2002 | Acres | |
| 2008/0305844 A1* | 12/2008 | Davis et al. | 463/1 |

OTHER PUBLICATIONS

Drexel, T.M., International Game Technology—Company report, Sep. 12, 1989 Dialogue file: 545 ref# 00850047.

* cited by examiner

*Primary Examiner* — Ronald Laneau
(74) *Attorney, Agent, or Firm* — Patent Law Group LLP; Brian D. Ogonowsky (57) ABSTRACT

A casino resort management system collects patron data, manages patron data in a high performance data warehouse, shares patron data with other systems and reports vital patron information. The system particularly tracks machine history, including changes in location, configuration and performance, and tracks the location history, including game type and denomination, and allows for placards to be moved from one gaming machine to another without losing historical machine or location information. In addition, the system provides two particularly useful graphical displays that simplify visual analysis of the large amounts of data within a casino. One display method depicts tables of thin bar graphs that compactly allow side-by-side comparison of different groupings of machines and another display method depicts machines in three dimensions so that each dimension can provide visual information to a viewer.

21 Claims, 10 Drawing Sheets

LOCATION IDENTIFIER

CAS. DUN. 4.1.14

FIG. 1

PLACARD IDENTIFIER 0 4 2 0 5 2

FIG. 2

MACHINE IDENTIFIER

GAMIT
Visual
Analysis

Current Sort Order: Manufacturer, Avg Daily Win Desc

Focus: 98 660   Location: 1824 72   Coordinates: 0, 0, 827, 32

Machine Info:
- Location MYS.A 053.08
- Placard 10825
- Machine ARI00262
- Revision 2000421
- Denom .05

Machine History:
- Par % 7.200
- Model Queen
- Type ARI2VQ
- Added
- OnBoard 1008.25

| Placard | Manufacturer | Denom | Avg Daily Win | Total Win | Coin In |
|---------|--------------|-------|---------------|-----------|---------|
| 4257 | ARI | .25 | 612.00 | 602,765.00 | 14,286,277 |
| 1867 | ARI | .25 | 611.00 | 519,820.00 | 8,624,264 |
| 2714 | ARI | .25 | 607.00 | 130,631.00 | 1,032,038 |

"A" / "B"  SHOWS RELATIVE WEAKNESS OF WIN FROM "B" MACINES VERSUS "A" MACHINES

SYSTEM AND METHOD FOR CASINO MANAGEMENT

RELATED APPLICATIONS

The present application claims the benefit of the following provisional patent application, which is hereby incorporated by reference in their entirety: U.S. Application Ser. No. 60/241,326 entitled CASINO RESORT MANAGEMENT SYSTEM, filed on Oct. 18, 2000 by David Keith Howington.

FIELD OF THE INVENTION

The present invention relates generally to casino resort management systems, and more particularly, to evaluating and improving gaming machine performance.

BACKGROUND OF THE INVENTION

Conventional casino resort management systems keep performance statistics on gaming machines. Casinos for instance, for regulatory and revenue generating reasons, keep statistics on how particular machines perform and how different locations in a casino affect performance of gaming machines For example, gaming machines are typically programmed to have a particular hold percentage (e.g., the percentage of patron money that will be kept by the machine). The hold percentage generally varies, though and may range from 0-20%. Machines having hold percentages that vary significantly from a regulated required rate may get a resort in trouble with a gaming board or other regulatory authority, and therefore tracking is critical for that reason alone. Also, some locations in a casino may generate better performance than other locations. For example, machines located near areas where patrons tend to congregate, such as food or drink bars, may experience heavier traffic than machines located in more obscure places within the resort. Using this information, a casino can better make decisions relating to gaming machine density and placement. Information gathered by resorts may also be used to determine the effect of other factors in a casino on gaming machine performance. For instance, it may be determined that persons standing in line near a narrow restaurant door entrance may tend to use proximately located machines more so than individuals who do not have to wait in line to enter an open area food location.

There are known gaming machine performance tracking methods using placards attached to the machines. A placard may indicate the machine brand, model and the denominations that a machine accepts (i.e., quarters or nickels). Each placard generally also has a unique identifier. Where placards are used with machines on a one-to-one basis, there is generally no problem identifying stationary gaming machines within a resort and tracking and analyzing performance information related to the machines. Tracking of gaming machine performance, however, is problematic where placards are moved from one gaming machine to another or where gaming machines are moved from one location to another. In conventional systems, if a placard is moved from a first gaming machine to another, then all information relating to the first machine can no longer be tracked using the original placard number. Similarly, if a gaming machine is moved from one location in a resort to another location in a resort and replacement of placards is a standard practice, then there is no way to track and to evaluate the performance of particular gaming machines in particular locations.

There is not now known a resort management system that accurately, automatically and efficiently provides for tracking and analysis of gaming machine performance correlated with resort location. In present systems, where gaming machines are identified using placards that may be moved to other machines periodically and where machines that are relocated periodically, such tracking and analysis is arduous at best. A system encompassing features that allow tracking and evaluation of gaming machine performance correlated with location, independent of placard identifiers and notwithstanding that such placards may be removed, is highly desirable. Accordingly, there is a need in the art for a system that can track gaming machine history, including changes in location, configuration and performance; tracks location history including game type and denomination, that tags construction activity in a casino zone; and which allows for the changing of placards infinitely without losing historical machine or location information.

SUMMARY OF THE INVENTION

The present invention provides for a casino resort management system that accomplishes the aforementioned desirable goals and overcomes the deficiencies in the prior art using and providing a location identifier for each location within a casino resort, a placard identifier for each placard, and a machine identifier for each gaming machine all in order to provide for more efficient and accurate tracking and evaluation of machine performance.

To accomplish these and other objects, in one aspect, the present invention comprises collecting patron data throughout a resort using patron club cards, direct mail coupons, and various other methods.

In another aspect the present invention comprises managing patron data in a high performance data warehouse.

In another aspect the present invention comprises sharing patron data with other systems.

In yet another aspect the present invention comprises reporting vital patron information throughout an organization.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 4-6 illustrate exemplary interface display screens for viewing and querying historical records associated with casino machines in accordance with an embodiment of the present invention.

DETAILED DESCRIPTION

The present invention includes a system for tracking machine history, including changes in location, configuration and performance; for tracking location history, including game type, denomination, and for tagging construction activity in a casino location; and for changing machine placards without losing historical machine or location information.

The system of certain embodiments of the present invention includes the collection of patron data throughout a resort, or multiple resorts, using patron club cards, direct mail coupons, and various other methods. In these embodiments, the system manages patron data in a high performance data warehouse and shares patron data with other systems. The system also reports vital patron information throughout an organization to system operators and to other individuals having a need to evaluate and track machine and location performance.

Particularly, the tracking and management system of the present invention tracks and manages casino action including machine history, location history, and tracks historical machine and/or location information notwithstanding that machine placards may have been substituted and placed with other machines or that machines have been moved to various other locations within a resort.

The present invention also tracks and manages patron club information. Patron club information, for example, may include spending and purchasing information about members in a club sponsored by a particular resort. In such clubs, it is typical that members may accumulate points and/or comps depending upon one or more factors including frequency of visits, gaming machine patronage, cumulative amounts spent and the like. The present invention tracks and manages such information associated with patron club members. The tracking and management system can also track patron club member preferences, including personal, family and group preference information. Patron information includes a wide variety of data including tracking patrons throughout the casino and any attached resort attractions, tracking gaming, credit restaurant, recreational and retail transactions, tracking activity of the patron's spouse and children, tracking promotional offerings and redemption by patrons, placing restrictions on a patron's club card, recording patron's preferences such as language, cocktail, restaurant, etc., establish patron's club levels, generate effective targeted marketing, evaluate groups or junkets according to profitability, score trip or history performance between different junkets, share, earn and redeem points between multiple casinos, and redeem rewards and/or comps at retail or resort locations.

Knowledge and analysis concerning such data is obviously desirable for club member and non-club member patrons for targeted marketing efforts and for improving customer service. For this reason, the system of the present invention also tracks and manages data related to patron hotel transactions and preferences; restaurant purchases, point and comp redemption; retail purchases; and information relating to recreational activities that patrons undertake, such as golf outings, spas, movies and the like.

Figure 1:
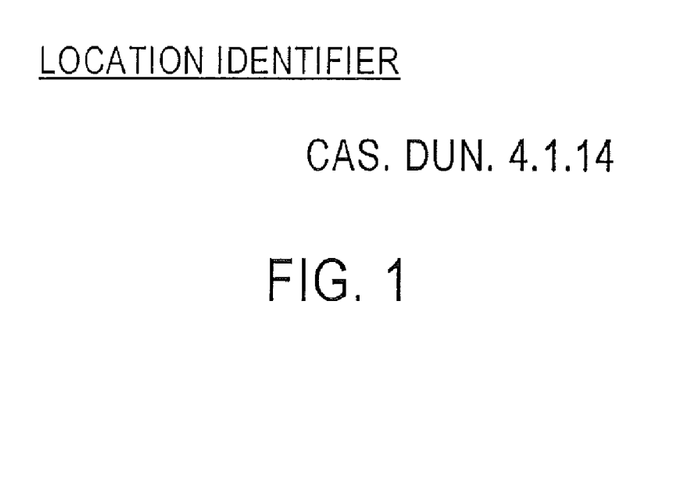
FIG. 1 illustrates an exemplary machine location identifier according to an embodiment of the present invention.

Returning to gaming equipment and its tracking, FIG. 1 illustrates an example of a location identifier within a casino. The location identifier identifies a machine location throughout a property. In a preferred embodiment, as shown in FIG. 1, the location identifier comprises a 14-digit alphanumeric identifier—CAS.DUN.4.1.14 that includes up to five hierarchical levels of identification. In particular, the first level "CAS" can refer to a particular establishment such as the Castle Casino; while the second level identifier "DUN" refers to a particular room, or sub-part, of the casino such as the Dungeon Room. Within this room, the equipment can be identified by its "zone" (i.e., 4) and its "row" (i.e., 1). An additional level of identification, the "seat" (i.e., 14), can be included to further pinpoint the machine location. The exemplary location identifier illustrated in FIG. 1 utilizes "periods" as separators between identification levels. Other separators, no separators, fixed field lengths for each level are some alternative formats also contemplated within the scope of the present invention and, further may be user defined or defined in accordance with a proprietary standard.

In certain embodiments, the location identifier can be printed on a variety of media and attached to a machine so that casino personnel can visually determine the identifier, bar scan the identifier, or otherwise obtain the location identifier from the machine. The location identifier can also be stored electronically within electronics of the machine or as an add-on memory device. With such electronic storage, the machine can transmit the location identifier to other electronic devices, such as a central management system that queries the machine, via local infrared, or wired, communications methods as well as by remote wireless or wired network communications.

Figure 2:
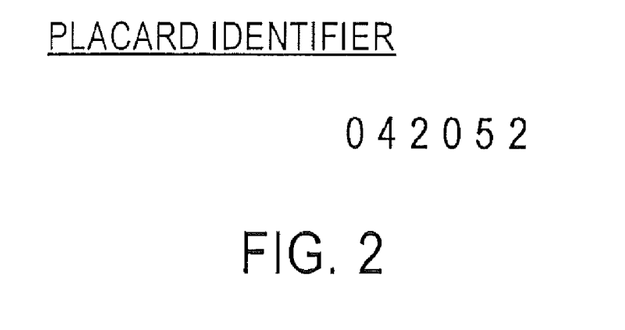
FIG. 2 illustrates an exemplary placard identifier according to an embodiment of the present invention.

FIG. 2 is an example of a placard identifier useful in embodiments of the present invention. These embodiments include placard identifiers that identify particular placards placed on gaming machines. These exemplary placards are movable from one gaming machine to another without a concurrent loss of location or machine information, because each machine also has a machine identifier described below. In an embodiment, the placard identifier includes a 6-digit numeric identifier, including one level of identification and the placard identifier is user definable or may be defined according to a proprietary standard. In FIG. 2, the placard number "042052" is used to denote a machine code "04" that, for example, indicates a quarter slot machine and a machine number "2052" that simply identifies a machine within this particular denomination. Similar to the location identifier, the placard identifier can be associated with a particular machine both electronically or visually and support a variety of methods for sharing the placard information with other devices.

Figure 3:
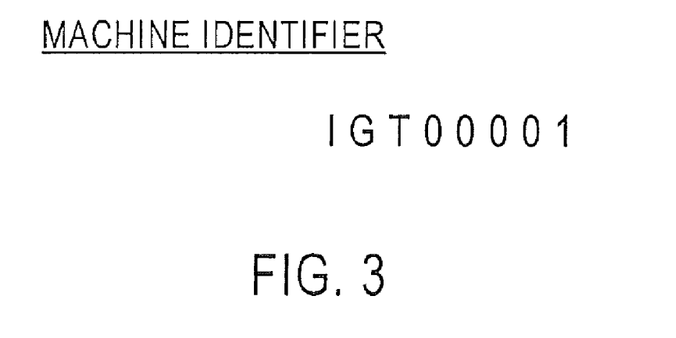
FIG. 3 illustrates and exemplary machine identifier according to an embodiment of the present invention.

FIG. 3 depicts an exemplary machine identifier. Embodiments of the present invention include a machine identifier, which is a unique number provided for every gaming machine. Each remote gaming machine is capable of transmitting its unique machine identifier to a central management host when prompted or in a proactive fashion such as when an alarm or alert is initiated. In one embodiment, the machine identifier comprises an 8-digit alphanumeric identifier, where the first three alpha digits (IGT) are reserved for a manufacturer code and the last five-numeric digits (00001) are sequentially auto generated. The machine identifier may be user defined or defined according to a proprietary standard.

The system of the present invention maintains and tracks machine and location history in a manner which allows for the changing of machine placards without losing historical machine or location information. Within this system, data relating to the machines within a casino, their changing locations within the casino, and their performance are stored in a database that permits querying, sorting and analyzing the historical machine data form a variety of perspectives. This database of information can be accumulated via manual data entry as machines and placards are moved throughout a casino or the database can be populated automatically by electronically querying one or more of the casino's machines for their identity, placard information and location identifier. One alternative embodiment includes electronic querying of one or more PDAs that are used by casino personnel to acquire and aggregate information from a number of different machines and then populating the database via the information in a PDA.

FIG. 4 is a sample system display 400, according to an embodiment of the present invention, illustrating a graphical interface for viewing, querying and retrieving placard changes and location changes for various machines. The display 400 provides a sub-window 402 that includes a listing of gaming machines by row with corresponding columns for location identifier, placard identifier, machine identifier, denomination, machine type, machine model, the par or hold percentage, and act percentage. A pop-up screen indicates which machine (ari00004) is highlighted. The organizational menu 404 allows a user to refine the interaction with the database, for example, by providing a query window, sorting by particular fields, and limiting the time-frame of interest.

Thus, the interface of FIG. 4 allows searches to be conducted by machine ID, placard ID or location ID. Queries of various types may also be formulated such as a query to find all machines having a particular denomination or being of a particular type. Historical information may be displayed by year, quarter, month, week or day. New information concerning machines may be added and machine information may be modified on this screen by a system operator.

In addition to the information displayed in sub-window 402, the bottom region 408 of the display 400 provides separate sub-windows 410 and 412 that detail location and placard histories, respectively, for the highlighted machine. Regarding location, the date and time of machine changes are provided in one column along with the placard identifier, the machine identifier, and revision dates. Regarding the highlighted placard identifier, columns are provided for the date and time of any placard changes for a particular machine, the location identifier, machine identifier, and revision date changes. Regarding the machine identifier, as shown in sub-window 414, columns are provided for the date and time of any change in location, the location identifier, the placard identifier and any revision date changes. In sub-window 416, regarding revisions, columns are set up for the date and time of any revisions, the reason for revisions, the par percentage for the highlighted machine, and a description column providing additional information regarding the machines. FIG. 4 is merely an exemplary interface and other, interfaces and screen layouts that provide similar functionality are contemplated within the scope of the present invention.

The exemplary display screen 500 of FIG. 5, provides information on machine performance as opposed to machine, location, placard and revision history. For the particular highlighted machine (ari00004), the display in FIG. 5 includes columns for the period, the coin in amount, the daily average for the coin in amount, the win/loss amount, and the daily average for the win/loss amount. These exemplary data fields are pertinent to slot machines; however, the present invention also contemplates maintaining historical information on other performance-related fields that may be appropriate for other types of machines managed by the casino. The performance data can be obtained by the management database through either manual data-entry or electronic communication between each machine and a centrally located server.

Figure 6:
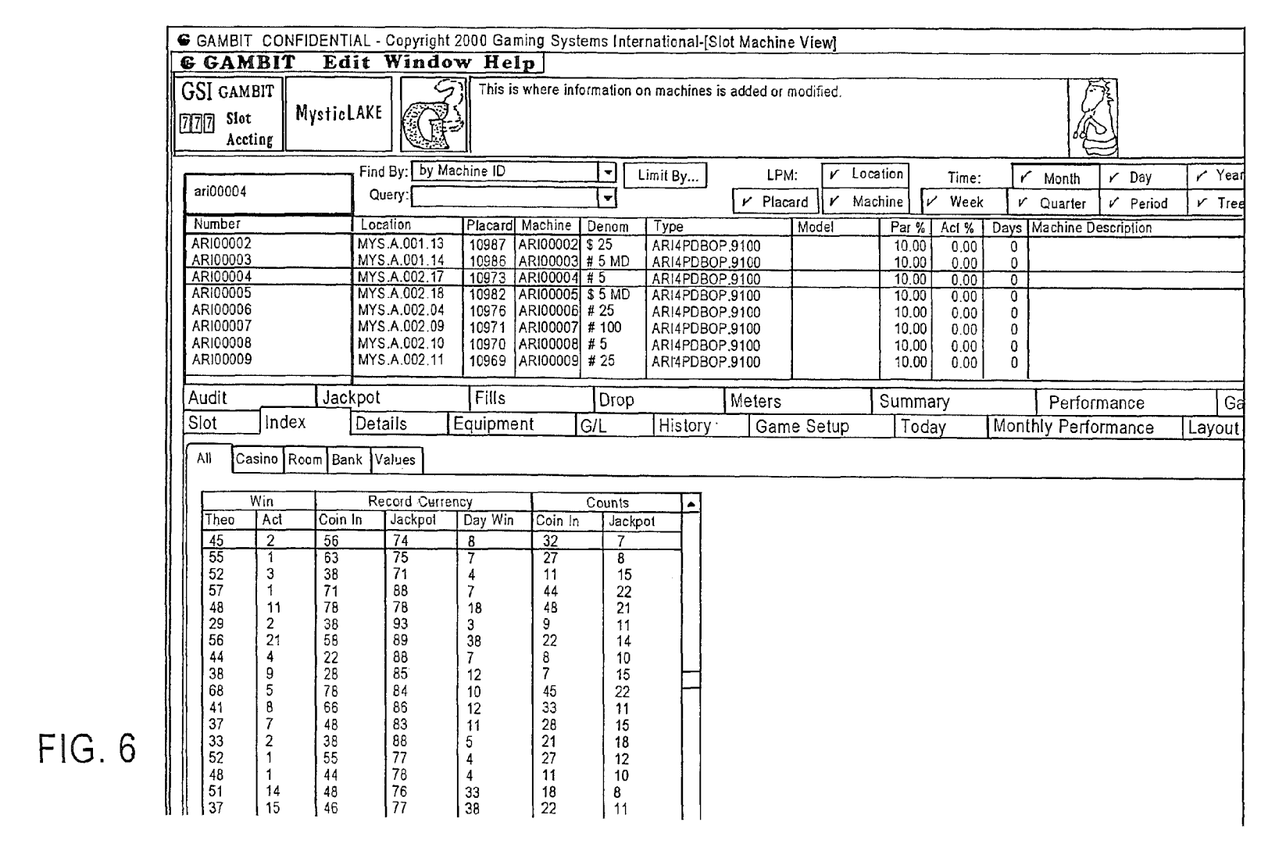

FIG. 6 contains similar location, placard, and machine information as FIGS. 4 and 5, except that FIG. 6 also includes information relating to wins, recorded currency amounts, and counts for the particular machine (ari00004) that is currently highlighted.

Using the exemplary interfaces depicted in FIGS. 4-6, casino resort management can use embodiments of the present invention to track and evaluate machine performance and location performance simultaneously. A system operator can use the information provided in the database, through the exemplary interface screens, to note, for example, that a particular location in the resort is slow and not attracting much action with the games currently in that location. Hot machines in other locations can be readily identified (by querying and sorting via the appropriate performance data) and then swapped into the slow location to improve action there. After the switch is made, the system operator can easily monitor the slow location to determine if action in the slow location has improved and by how much. By rotating other machines into the same location, the displayed information can also be used to determine which machines provide the greatest impact on the location.

The tracking features of the present invention are particularly useful where machines have been moved into hot and cold locations over a period of time. Because embodiments of the present invention allow for tracking on a machine/location basis, it is relatively easy to determine and compare the machine performance based on location. Even if placards on various machines have been replaced, the machine performance history and location history are preserved. The database of information simultaneously provides tracking information regarding revisions to machine locations, placard identifiers, and associated machines and provides vital information for decision-making to the casino. Revisions may include, but are not limited to, information regarding gaming machine moves, glass changes, software changes, peripheral additions and changes, location in/out of service information, game in/out of service information, maintenance information and alarms.

As mentioned earlier, many casinos also employ data gathering techniques (e.g., magnetic swipe cards at each machine) for identifying a patron and associated personal information, the patron's location within the casino, that patron's wagering characteristics, that patron's affiliation with other groups or patrons, promotional items or comps related to the patron, and that patron's other activities related to arriving at, enjoying and departing from the casino. Embodiments of the present invention contemplate sharing of the patron related information with the machine management database information described earlier. The sharing of this information allows scores for and evaluations of games and players. Game and player-related relationships may also be compared on any basis such as game type, denomination, location, group, age, sex, status, and club level. Additionally, virtually any relationship comparison may be reviewed and reported using the system of the present invention making evaluation of such data simpler and faster than traditional methods.

In addition to the previously mentioned benefits provided by various embodiments of the present invention, using the performance tracking features of the invention, cool performing machines can be compared to other machines of the same type, in the same zone or location, and problems and maintenance issues can be easily identified. Comparison of patrons can also be made over user defined periods (such as 30, 60 and 90 day periods), hot machines can be identified quickly and compared against other machines, and poor performing games can be identified along with questionable players. Indices can also be compared by seat, row, zone, or by virtually any selectable parameter related to a resort. The present invention also has case and set management features which allow for identification of under performance issues so that they may be addressed in a timely and efficient manner. The case management system allows for evaluation of "out of parameter" games, patrons, and/or groups that are under performing. The set management system allows for collection and evaluation of cases that meet certain criteria for evaluation.

Figure 7:
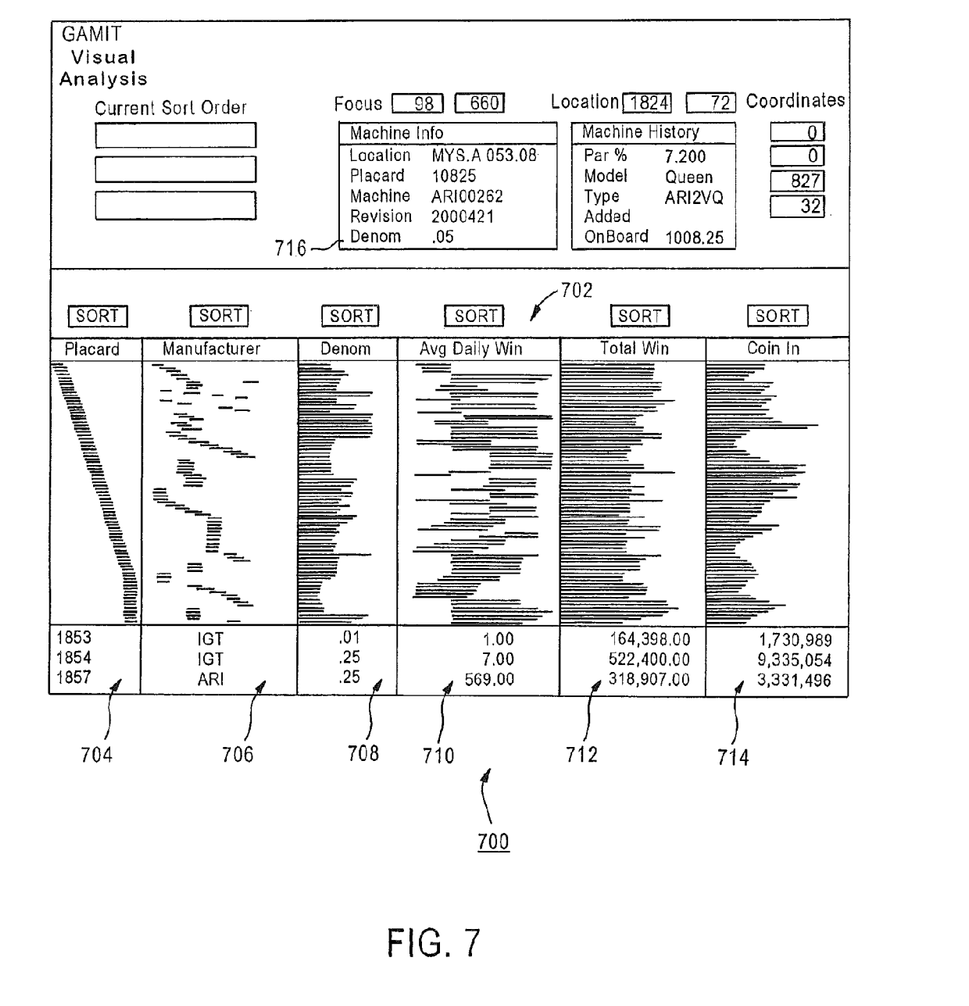
FIGS. 7 and 8 illustrate exemplary thin bar graphs for visually displaying a multitude of machine information according to an embodiment of the present invention.

FIG. 7 depicts an exemplary screen 700 for displaying the large amounts of data available to a system operator. In particular, FIG. 7 illustrates a visual analysis display tool presenting machine performance information as thin bar graphs in a data table. Because any given resort may have thousands of machines, it is virtually impossible for a system operator to view performance for more than a few machines on a typical display screen. Machine performance patterns may therefore go undetected. The exemplary data visualization display of FIG. 7 utilizes a thin bar graph format, allowing a system operator to simultaneously visually analyze performance and other data for potentially thousands of machines on one display screen. The display table 702 includes columns for placard identification 704, manufacturer 706, denomination 708, average daily wins 710, total wins 712, and coin in 714. Also, moving the cursor to any location on the bar graphs displays 716 information concerning a particular machine such as the location placard, machine revision and denomination information for a particular machine, and the machine history, par percentage, model, type, on-board and any additional information.

Figure 8:
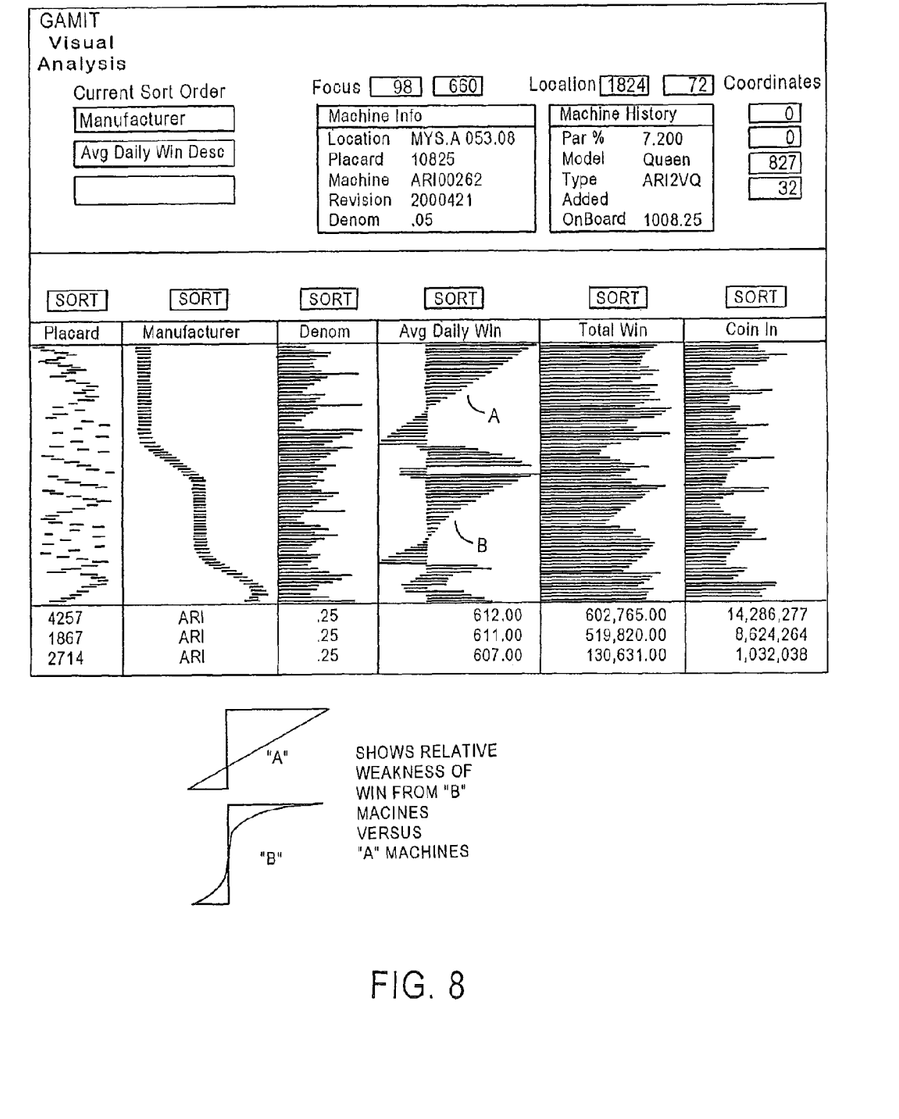

FIG. 8 is another example of a display showing the visual analysis capability of an embodiment of the present invention. Particularly, FIG. 8 demonstrates the sortability and relational features of the visual analysis in presenting comparisons between machines regarding performance, manufacturer, denomination, average daily win, total win and coin in. For example, by viewing the average daily win column, a casino operator can easily determine (from the shape of A vs. B) the relative weakness of the machines B of one manufacturer as compared to machines A of a second manufacturer in FIG. 8.

Figure 9:
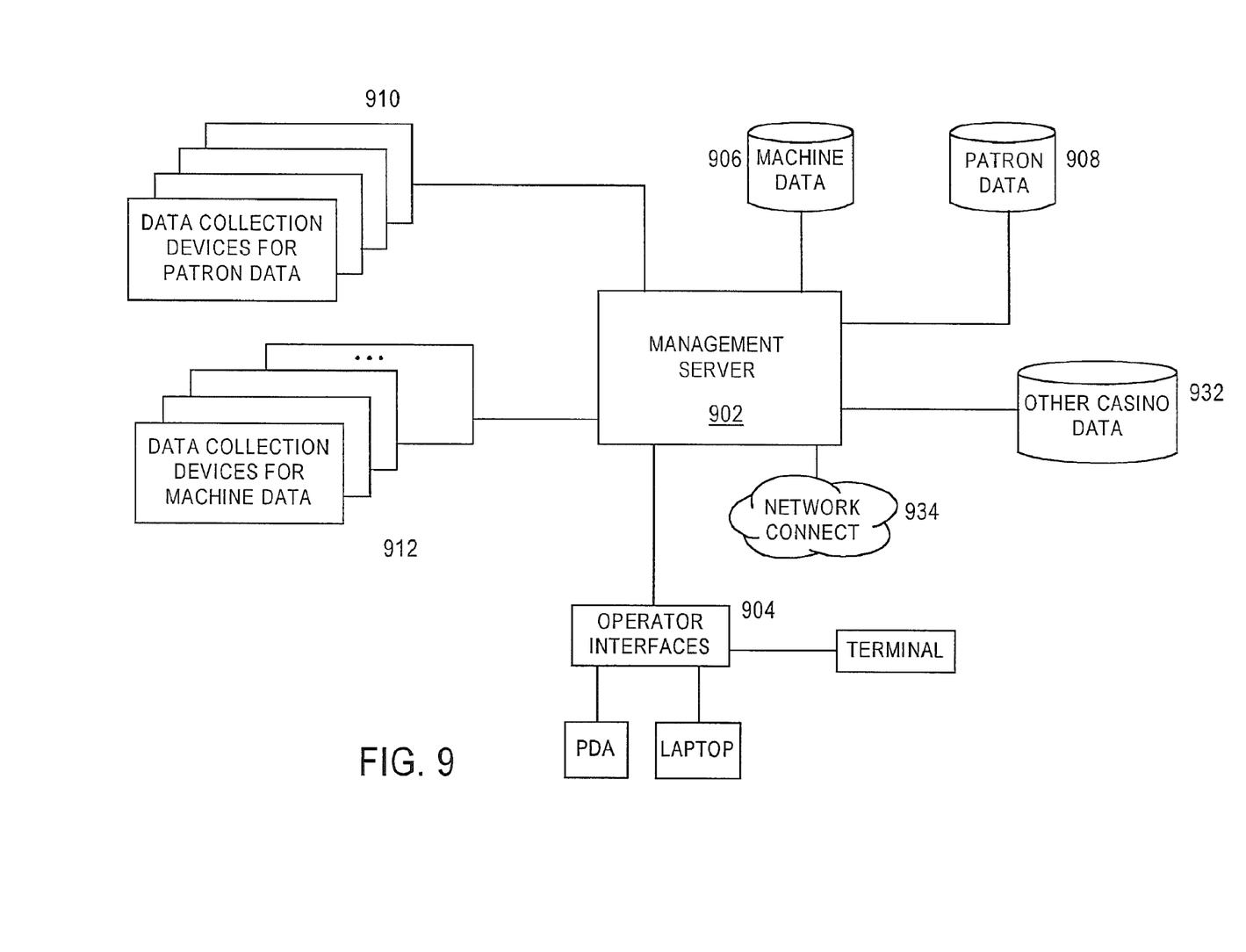
FIG. 9 illustrates an exemplary arrangement of a casino management system in accordance with an embodiment of the present invention.

FIG. 9 depicts a block diagram of an exemplary casino management system. A management server 902 comprises one or more computing hosts that can be located locally or remotely to a casino resort. One management server 902 can be provisioned for each casino or for multiple casinos. Casino personnel interact with the management server 902 via the operator interface 904 that can run on wireless or wired computers, laptops or PDAs that can be remotely or locally located. This interface 904 provides the exemplary displays of FIGS. 4-8 as well as permits operators to enter, edit and delete data from the server 902. The interface 904 can include means for connecting PDAs or other data collection devices in order to acquire data collected from remote machines that do not communicate directly to the server 902. The management server 902 also communicates with data warehouses that store patron related data 908 and machine location and performance data 906. These databases can be remotely or locally located and can be a single warehouse or disjoint databases. Within the casino, apparatuses are used at gaming stations, ticket windows, funds cages and other attractions to collect data about patrons 910 and to collect data about the gaming machines 912. These data collection devices and gaming machines (910 and 912) can be networked together and communicate with the management server 902 by either polling methods or by self-initiated communication. Alternatively, data collection devices can collect and store data and then download the collected data to an operator's PDA which is periodically used to acquire the collected data throughout a casino.

One additional benefit of the present inventive system is that the casino layout can be modeled graphically so that the machine location and performance can be presented more visually. In such an arrangement, a casino layout, or 3D virtual world, is created and stored (e.g., 934) for use by the server 902. In this environment, an operator can visually locate a location in the casino by selecting that location from the visual display and view the performance of the machine, or machines, at that location.

Figure 10:
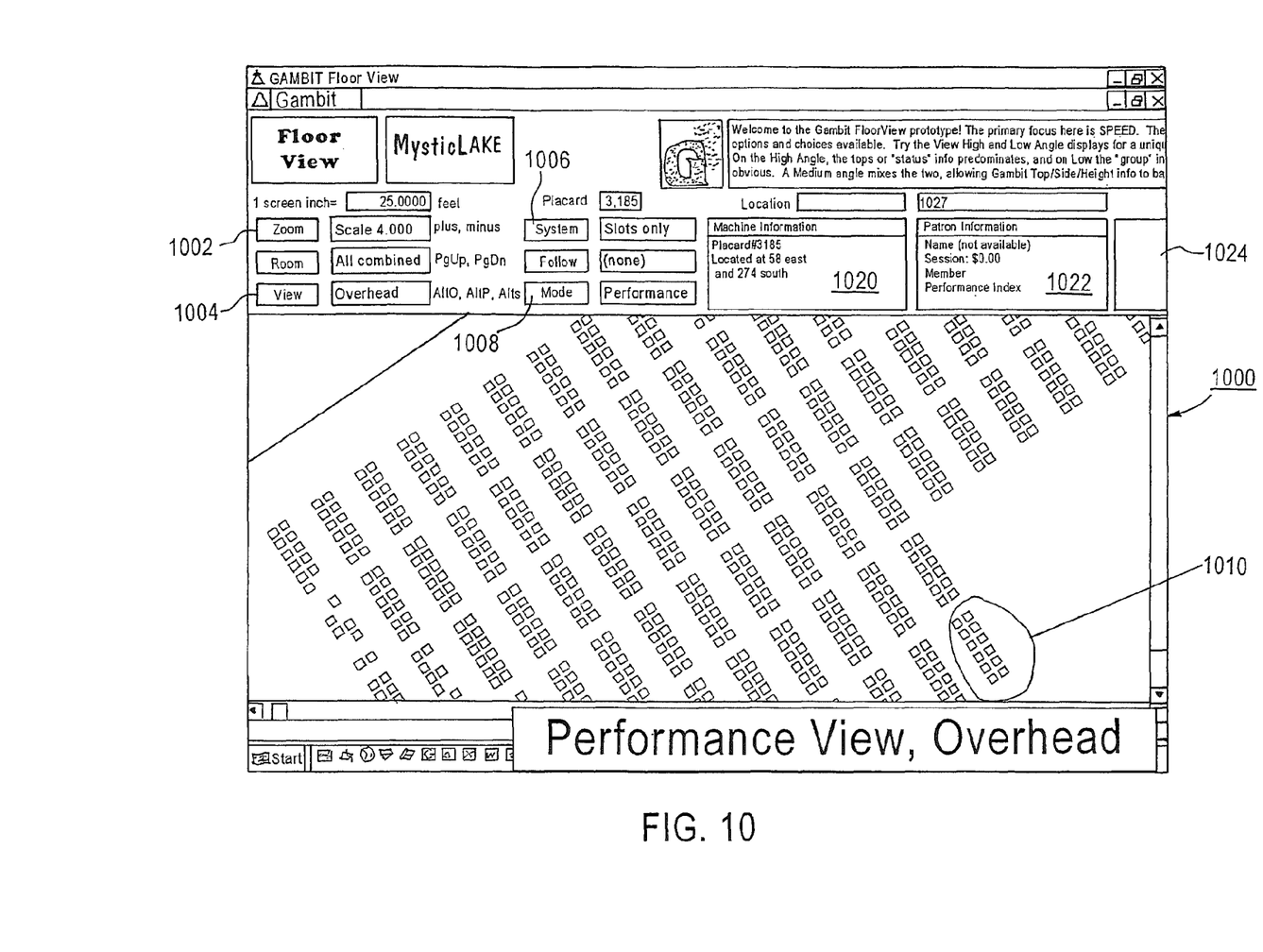
FIGS. 10-12 illustrate exemplary casino floor layout for visually displaying a mutlitude of machine information in a single display screen.

In particular, aspects of the present invention relate to techniques for visually displaying data about the machines in a casino. FIG. 10 illustrates an overhead view of machines on the casino floor. In other embodiments of the present invention, this display could also depict other type of games and gaming tables. The external database 934 can store information about each of the different floor locations in the casino. For example, each bank 1010 of machines can have stored data associated therewith which identifies the "orientation" of the bank. This "orientation" indicates the angle of the bank 1010 in relation to some reference point (e.g., magnetic north).

When a machine is located or moved within the casino, its new location is reported to the management system. Using the stored information about the different banks 1010, the machine can be automatically depicted on the display 1000 in its appropriate location and orientation without requiring an explicit floorplan to be pre-created for the casino floor. Also included in the display 1000 are user selectable settings that can control the features displayed. In particular, setting 1002 (or clicking on the view) allows a zoom factor to be set; setting 1004 determines the perspective of the displayed view; setting 1006 selects the type of machines depicted in screen 1000; and setting 1008 determines by what criteria the machines are displayed.

For example, in the display 1000 of FIG. 10, "performance" has been chosen. Performance is a metric that can be identified and set by the user to mean "total coin in", "profitability", "average daily win", etc. Embodiments of the present inventive system provide the user a list of conventional performance measures and permit the user to select what definition of performance to use. This definition selection is modifiable and is not a hard-coded aspect of the system. Although FIG. 10 is in black and white, the individual squares (i.e., machines) are different colors depending on their performance. The colors that are associated with a different performance ranges are settable by the user from a palette screen so that a usr can customize the display or use a default color setting.

In FIG. 10, there is also a window 1020 that displays machine information about the machine which the cursor is floating over; the machine information in the window 1020 is updated as the cursor moves. One alternative might be to require the user to click on a machine to update the window 1020. The machine (i.e., placard 3185) on the display 1000 can also be caused to blink so that the user knows which machine is being displayed in window 1020. This is helpful because the cursor may span more than one machine and the machine closest to the cursor's tip is the one which updates the window 1020.

If the machine in window 1020 is being played by a patron using a magnetic card, then patron information can be displayed in window 1024. From the database 934, a picture of the patron can also be retrieved and displayed to help casino personnel identify players on the floor.

The database 934 can include patron information that identifies a player who is considered a "hot player", that is, a patron whom the casino wants to make sure has an enjoyable time. Thus, the focus of display 1000 can move automatically in a sequence between machines which are being played by hot players. In this manner, the view continually updates statistics about those "hot players" without requiring the user of the system to manually move the cursor. As a new "hot player" starts playing, the focus of the display 1000 can move to the new machine and then return to its automatic sequence after a predetermined time period.

Figure 11:
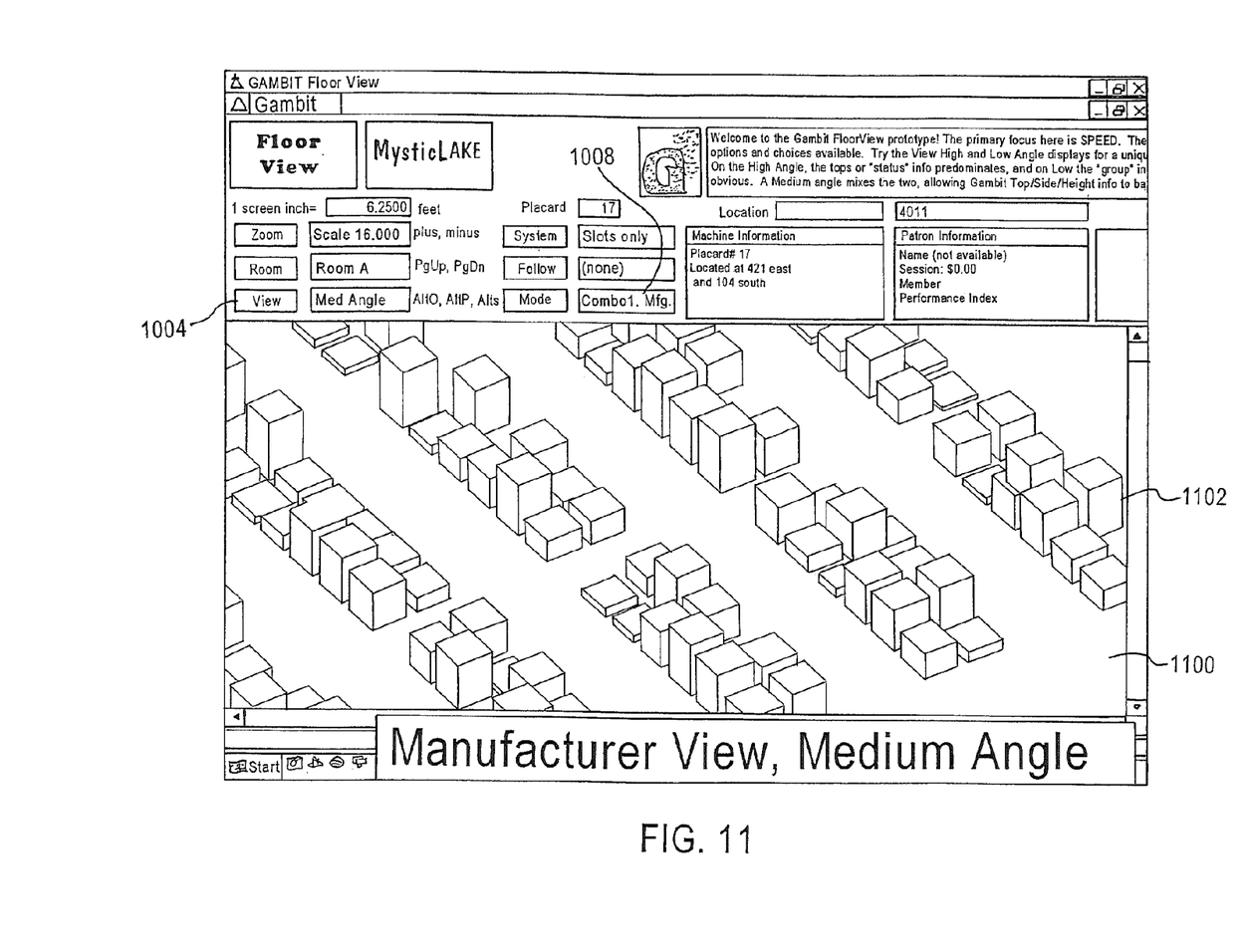
Figure 12:
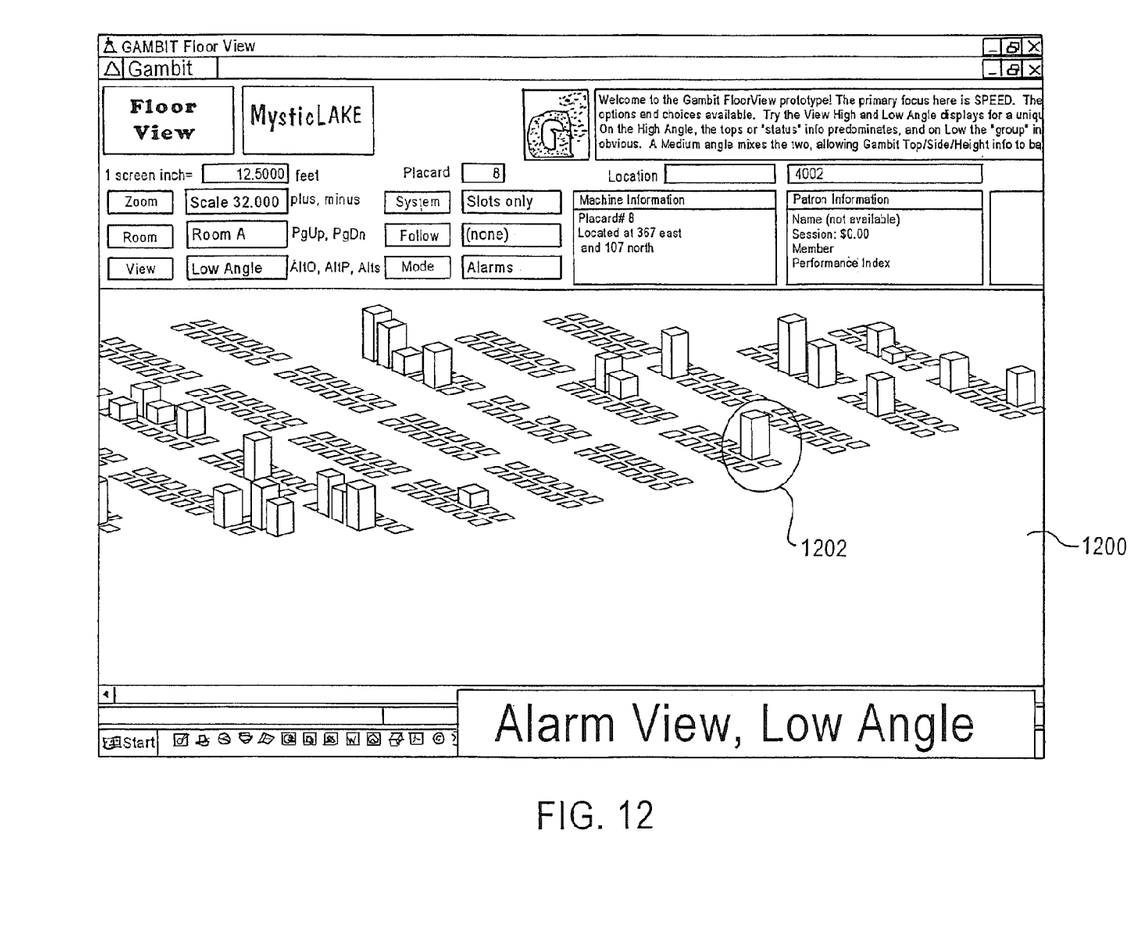

The display of FIG. 10 is only two dimensional and provides limited information to a viewer. FIGS. 11 and 12 show two possible three dimensional views of the casino floor. In FIG. 11, the display 1100 has been set via settings 1004 and 1008 to display a medium angle view according to "Combo1". In this display each machine is represented by a three dimensional icon, for example a rectangular column 1102, in which there are three visual cues to convey information. The column's top color is one visual cue, the column's side color (any visible side) is another visual cue, and the height of the column is another visual cue. In an exemplary embodiment, the top color is associated with the machine's manufacturer, the side color is associated with the machine's denomination, and the height is associate with performance.

The system allows a user to set the colors for each visual cue. For example, the system can provide a list of all the different machine manufacturers and a palette of different colors. The user then associates a manufacturer (e.g., Aristocrat, IGT, etc.) with a color. The same type of operation can be performed in associating a color with each machine denomination (e.g., nickel, quarter, etc). Thus, the display 1100 displays three data points—manufacturer, denomination, and performance—in three dimensions.

FIG. 12 depicts a low angle view of alarm conditions. Again, a user is presented with a window that lists the various alarms and is permitted to associate a color with each alarm. In this example display 1200, the side of the column 1202 is associated with the general type of alarm (e.g., mechanical, electronic, customer service, etc.) and the top color is associated with the specific alarm (e.g., coin jam, hopper empty, etc.). In this embodiment, the height of the column indicates the age of the alarm, with the higher column indicating an older alarm. Accordingly, a user can quickly view the alarms currently active and prioritize them according to severity as well as age.

The difference in viewing angles helps exaggerate certain aspects of the three dimensional view. For example, the low angle view of the alarm screen in FIG. 12 allows the height and side color to predominate. The medium view of FIG. 11 allows both the side color and top color to be equally viewable while a high angle view (not shown) would allow the top color to predominate and make differences in column height less discernable, but still visible. This functionality accents desired aspects of the data to increase its speed of recognition, and therefore adds value in its presentation to the user.

The exemplary screens of FIG. 10-12 are meant as examples only and are not meant to limit any embodiment of the present invention to only the specific screens illustrated. One of ordinary skill would easily recognize that the underlying visual display methods described herein can be used to simultaneously visualize any three data characteristics associated with a machine on the casino floor.

The casino management system architecture and methods herein described include a number of additional benefits and features that simplify and automate management and tracking of machine and patron data for a casino.

In particular, the interface provided by the management server 902 to a casino operator includes context sensitive help information. Similar to the pop-up windows available on many web pages, an operator can "mouse-over" a field on the interface of FIG. 4, for example, to reveal explanatory information about that field. This "help" information as well as the field names and identifiers can support multiple languages which can be selected and changed by an operator.

One particular benefit of the present inventive system is that the burden of daily record keeping and accounting required of casinos can be significantly reduced. For example, tracking slot machine "jackpots" and "fills" can be easily accomplished. In one example, a casino employee can arrive at a machine, swipe an ID card through a PDA, scan one or more machine identifiers (e.g., placard) using the PDA, enter the transaction amount and type (i.e., jackpot or fill), and eventually download the data to a central repository.

Workorders and other maintenance activity can also be automated. In response to a machine alarm, or other more-traditional indicator, a maintenance personnel can be dispatched to a machine, swipe an ID card through a PDA, scan a machine identifier, identify and record a maintenance activity (which can even include removing parts from inventory), and provide this historical maintenance data as requested.

Because of the communications capabilities of the various machines, the machines can determine and announce, themselves or through the server 902, a "jackpot" or "fill" condition. In response, a page, e-mail or other electronic notification is generated to dispatch personnel and the type and timing of the response is tracked. Activity response times can be monitored so that uncompleted tasks can be identified and escalated to produce additional dispatch messages. The server 902 can maintain and store 932 work schedules and work assignments in order to automatically determine which personnel to dispatch according to the appropriate machine's location.

In certain embodiments of the present invention, the central data collection features and the networked communication (e.g., 934) of the casino machines and the server 902 results in additional benefits. For example, playing different machines and partaking of the resort attractions can be accomplished using magnetic cards (similar to using a credit card to pay-at-the-pump) instead of traditional currency and coin methods. Within this embodiment of the present invention, funds for a particular patron can be electronically identified and transferred to the casino. As the patron enjoys the casino's attractions using a magnetic, or other smart technology, card, the funds associated with that patron is adjusted positively and negatively, and eventually the patron can cash-out at a casino cage.

In one exemplary embodiment, the magnetic cards are called "GO-CARDS" and permits anonymous, cashless paying at a casino. According to this embodiment, patrons
 pick up a GO-CARD;
 place the GO-CARD in a electronic funds transfer machine or charging station;
 (if necessary) place money in the charging station;
 play each machine having a card reader in the casino without cash with credits being accumulated or depleted;
 at each machine, press the cash-out button and all remaining credits are stored on the GO-CARD;
 move to other machines;
 cash-out at the casino cage or an automated GO-CARD cash-out station.

In other embodiments, the GO-CARDS have one or more of the following features:
 pin numbers for added security against loss;
 limited amount of downloadable credits;
 limited balances which can accumulate;
 using paper receipts from each machine for lost card security;
 marketing promotion which can "charge-up" player club cards and players redeem direct mail free-play offers right at the machine, eliminating the need to go to the cage, and eliminating coupons or tickets;

restricting promotional credits to play only.

Furthermore, cashless ticket accounting can be implemented at the casino to complete, issue, track, verify and pay-out tickets right at the game or at a casino cage.

In the foregoing specification, the invention has been described with reference to specific embodiments thereof. It will however be evident that various modifications and changes may be made thereto without departing from the broader spirit and scope of the invention. The specification and drawings are, accordingly, to be regarded in an illustrative rather than a restrictive sense.

What is claimed is:

1. A visual analysis method for analyzing the performance of gaming machines in a casino comprising the steps of:
    acquiring respective gaming machine data, by a server connected to receive data from the gaming machines, for each of the gaming machines arranged in the casino, said gaming machine data having a plurality of separate components;
    the server being programmed for generating information for a display device, wherein the display device generates a plurality of three-dimensional icons on a two-dimensional medium, each three-dimensional icon corresponding to one of the gaming machines, an arrangement of the three-dimensional icons on the two-dimensional medium corresponding to a physical layout of the plurality of gaming machines within the casino; and
    for each particular generated three-dimensional icon, displaying a physical dimension of each three-dimensional icon to be approximately proportional to a first data component of the gaming machine represented by an associated three-dimensional icon.

2. The visual analysis method of claim 1, wherein the first data component represented by the physical dimension comprises financial performance of an associated gaming machine.

3. The visual analysis method of claim 1, wherein the icons have at least a top and a side, a color of the top of each icon representing a second data component, and a color of the side of each icon representing a third data component.

4. The visual analysis method of claim 1 further comprising the steps of:
    associating a respective location identifier with each of a plurality of locations within the casino;
    associating a respective machine identifier with each of the plurality of gaming machines within the casino; and
    tracking a relationship between a particular gaming machine and a particular location based on the location identifiers and the machine identifiers.

5. The visual analysis method of claim 1 further comprising the step of: adjusting a viewing angle of a display of the plurality of three-dimensional icons to see differences between the physical dimensions of the icons.

6. The visual analysis method of claim 1 further comprising the steps of: acquiring respective patron data for one or more of the plurality of gaming machines; and in response to one of the displayed three-dimensional icons being selected, displaying the respective patron data.

7. The visual analysis method of claim 6, wherein the patron data includes a picture of the patron.

8. The visual analysis method of claim 6 further comprising the steps of: determining from the respective patron data, a set of the displayed three-dimensional icons, said set of icons corresponding to those gaming machines being played by a patron matching a predetermined criteria, and automatically displaying, in sequence, the set of icons.

9. The visual analysis method of claim 1, wherein the physical dimension of each icon that is approximately proportional to the first data component of the gaming machine is a height of an associated icon.

10. The visual analysis method of claim 1 further comprising the steps of: determining from the respective gaming machine data, a set of displayed three-dimensional icons, said set of icons corresponding to those gaming machines experiencing an alarm condition, and automatically displaying the set of icons.

11. The visual analysis method of claim 1 wherein the icons have sides and a height dimension, wherein a color of one or more of the sides conveys a second data component of the gaming machines associated with the icons, and the physical dimension of each icon approximately proportional to the first data component of the gaming machine is the height dimension, wherein the height dimension conveys financial data associated with the gaming machines.

12. The visual analysis method of claim 1 wherein the two-dimensional medium is a display screen.

13. A casino management system comprising:
    a server connected to receive data from a plurality of gaming machines arranged in a casino; and
    a display device connected to display, on a two-dimensional medium, information generated by the server, the information for being displayed to a user for analyzing performance of the gaming machines, the server being programmed for performing the steps of:
        acquiring respective gaming machine data for each of the gaming machines in the casino, said gaming machine data having a plurality of separate components;
        generating a plurality of three-dimensional icons on the two-dimensional medium, each three-dimensional icon corresponding to one of the gaming machines, an arrangement of the three-dimensional icons on the two-dimensional medium corresponding to a physical layout of the gaming machines within the casino; and
        for each particular generated three-dimensional icon, displaying a physical dimension of each three-dimensional icon to be approximately proportional to a first data component of the gaming machine represented by an associated three-dimensional icon.

14. The system of claim 13, wherein the first data component represented by the physical dimension comprises financial performance of the gaming machine.

15. The system of claim 13, wherein the icons have at least a top and a side, a color of the top of each icon representing a second data component, and a color of the side of each icon representing a third data component.

16. The system of claim 13, wherein the server is further programmed to carry out the steps of:
    associating a respective location identifier with each of a plurality of locations within the casino;
    associating a respective machine identifier with each of the plurality of gaming machines within the casino; and
    tracking a relationship between a particular gaming machine and a particular location based on the location identifiers and the machine identifiers.

17. The system of claim 13, wherein the server is further programmed to carry out the steps of: adjusting a viewing angle of a display of the plurality of three-dimensional icons to see differences between the physical dimensions of the icons.

18. The system of claim 13, wherein the physical dimension of each icon that is approximately proportional to the first data component of the gaming machine is a height of an associated icon.

19. The system of claim 13, wherein the server is further programmed to carry out the steps of: determining from the respective gaming machine data, a set of displayed three-dimensional icons, said set of icons corresponding to those gaming machines experiencing an alarm condition, and automatically displaying the set of icons.

20. The system of claim 13 wherein the icons have sides and a height dimension, wherein a color of one or more of the sides conveys a second data component of the gaming machines associated with the icons, and the physical dimension of each icon approximately proportional to a first data component of the gaming machine is the height dimension, wherein the height dimension conveys financial data associated with the icons.

21. The system of claim 13 wherein the two-dimensional medium is a display screen.

* * * * *